UNITED STATES PATENT OFFICE.

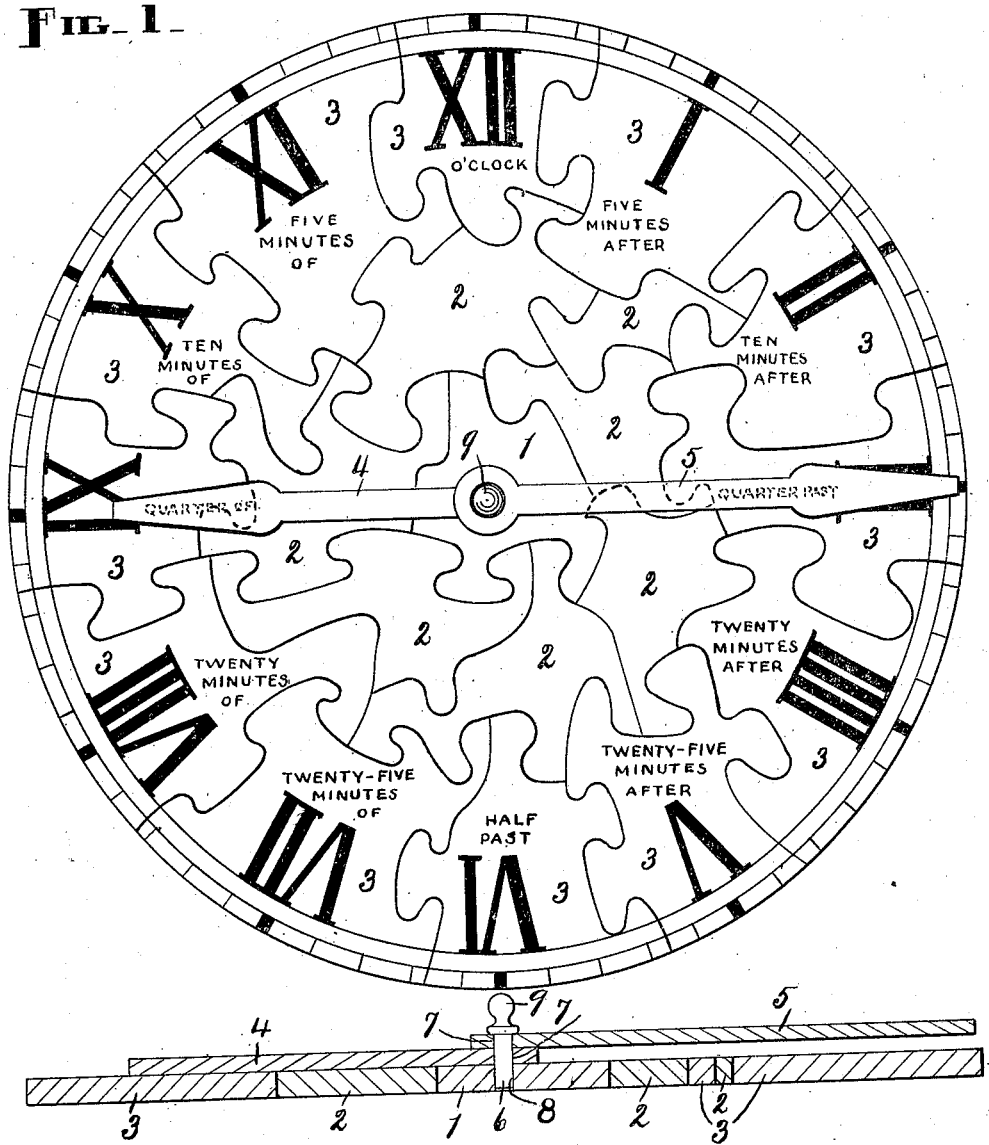

MYRON A. GILMAN, OF WESTFIELD, MASSACHUSETTS.

EDUCATIONAL TOY.

1,276,344.   Specification of Letters Patent.   Patented Aug. 20, 1918.

Application filed August 1, 1917. Serial No. 183,969.

*To all whom it may concern:*

Be it known that I, MYRON A. GILMAN, a citizen of the United States of America, and a resident of Westfield, in the county of Hampden and State of Massachusetts, have invented a new and useful Educational Toy, of which the following is a specification.

My invention relates to improvements in children's toys for educational purposes, and more particularly to devices for teaching the manner of telling the time of day, and said invention resides in a cut-up or dissected clock-face representation, which is provided with movable and removable hour- and minute-hands, all as hereinafter set forth.

The primary object of my invention is to produce a toy of the kind specified above, for use in the home, kindergarten, or play-room, anywhere, which arouses the child's interest and fixes his attention so that the faculty to tell time is easily, quickly, and permanently acquired or stimulated into activity, as the case may be, such toy being simple and inexpensive in construction and character, and capable of attracting the notice of even very young children.

This clock-face toy is free from the pronounced and obvious elements so frequently present in educational toys, and which to the child bear more or less clearly the ear-marks of the teaching art, or suggest, even subconsciously perhaps, that an attempt is being made to require and possibly almost force the child to apply himself to the task of learning a certain thing, as to tell time. To the child this device is purely and simply a toy. Without any alarm or misgiving whatsoever, he plays with the blocks, fits them together, with indifferent success at first probably, observes, without effort on his part or outside prompting, that the disk which he succeeds at last in completing, and which is put together with increasing facility the oftener the attempt is made, possesses certain peculiarities which mean something, and discovers that it resembles the face of the clock on the wall or mantle. Then the hands are applied and operated aimlessly at first, but shortly the child finds again that they relate to the old, familiar clock, and gradually the process is worked out, and the aforesaid clock ceases to be a mystery—the child has learned how to tell time by that or any other timepiece.

The toy possesses, in its cut-up pieces which are capable of being united one with another only by fitting them together in the one possible way in each case, and its rotatable hands, elements of amusement for the immature mind of the young child, quite apart from the practical element, and it is herein that much of the value of said toy lies, for the reason previously set forth.

Other objects and advantages will appear in the course of the following description.

I attain the objects and secure the advantages of my invention by the means illustrated in the accompanying drawings, in which—

Figure 1 is a plan of a toy which embodies a practical form of my invention, and, Fig. 2, a central section through said toy, such section being horizontal so as to include the hands in longitudinal section and inasmuch as the latter in the first view are both horizontally positioned.

Similar reference characters designate similar parts throughout the several views.

As clearly shown in the drawings, my toy consists of a plurality of members or pieces 1, 2, and 3 cut out in irregular shapes, but adapted to be fitted together to form a clock-face, dial marks and characters being delineated on such pieces and so on the completed face to form the dial, an hour-hand 4 and a minute-hand 5, and a pin 6 adapted to be passed through openings 7 in said hands at their inner ends into an opening 8 in the piece 1. The pin 6 has a head 9 to facilitate grasping the same.

The cut-up or dissected pieces 1, 2 and 3 may vary to any reasonable extent in their irregular outlines, provided they are so cut that they can be properly fitted together to make up the disk which constitutes the clock-face including the dial.

There is but a single piece 1 and that is the central member of the clock-face, in which is the opening 8 for the pin 6.

There are in this instance seven pieces 2, but this number may be varied. The pieces 2 are those with the piece 1 which are inside of the pieces 3, the latter being the outer or peripheral pieces.

There are preferably twelve of the peripheral pieces 3. Each of these pieces is irregular in outline, except for one arcuate edge which forms a part of the periphery of the complete clock-face. An hour and several minute graduation marks are delineated on the front side of each piece 3 adjacent to the arcuate edge thereof, such marks entering into and assisting to make up the clock-face dial, in which there are twelve hour marks and sixty minute marks. One of the Roman numerals I to XII, inclusive, is also delineated on the face of each piece 3, and the arrangement is such that said numerals follow in order from right to left when the pieces 3 are united with each other to form the dial. In addition to the graduation marks and the aforesaid numerals on each piece 3, there may be delineated thereon additional data, such as statements relative to the number of minutes past and of the hour, and the quarter past and half past and the quarter of the hour, to assist in understanding the operation and meaning of the minute-hand 5, substantially as shown. Instead of stating the number of minutes adjacent to the III, IV, and IX, the terms "Quarter past", "Half past", and "Quarter of" are employed. The aforesaid minute, quarter-hour and half-hour designations are of assistance to the child in mastering the problem upon which he is engaged, although generally without knowing that it is a problem.

In practice, assuming that all of the parts of the toy are apart or disassembled, it first becomes necessary to fit together the pieces 1, 2, and 3 until the clock-face with its dial is complete. Then the pin 6 is passed through the openings 7 in the hubs of the hour- and minute-hands 4 and 5, and said pin is thrust into the opening 8 in the piece 1. Now the hands 4 and 5 can be turned on the pin 6 over the dial of the clock-face, being at first so turned merely for the pleasure to be derived from the act, but later, as the child's curiosity and interest become more acute, to designate different hours and fractions of hours, in the innumerable ways possible.

When the child gets tired of playing with the toy he will usually dissect it and leave it in condition for a repetition of the constructive and instructive processes, or an older person can disassemble the parts.

Although many dissected puzzles have been produced and a "return" card bearing rotatable (but not removable) pointers, for office use, is old, a device such as I have herein set forth is new and novel.

I make no claim broadly to a dissected puzzle, and no claim to hands or pointers apart from my peculiar clock-face.

As previously pointed out or intimated, some changes may be made in the shape, size, front-face characters, etc., of the toy, such changes not involving, however, any departure from the scope of the appended claims. In this connection attention is called to the fact that Arabic figures may be used in place of the Roman numerals, or may be placed on the other side of the clock-face or the back sides of the pieces 3.

What I claim as my invention, and desire to secure by Letters Patent, is—

1. As a new article of manufacture, an educational toy comprising a dissected clock-face, and hands attachable to one of the dissected pieces of said clock-face, and rotatably movable over said face.

2. As a new article of manufacture, an educational toy comprising a dissected clock-face, hands, and a pin adapted to be passed through said hands and insertible in one of the dissected pieces making up said clock-face.

3. As a new article of manufacture, an educational toy comprising a clock-face which consists of exterior and interior dissected pieces, one of such interior pieces being perforated, perforated hands, and a pin receivable in the perforations in said hands and perforated piece, the perforation in said perforated piece being located in the center of said clock-face, and said pieces, hands and pin all being separable one from the other.

4. As a new article of manufacture, an educational toy comprising a clock-face which consists of dissected exterior and interior pieces, each of said exterior pieces including an individual portion of the clock-face dial, and hands attachable to one of said interior pieces, at a point which is in the center of said clock-face, and rotatably movable over said face.

5. As a new article of manufacture, an educational toy comprising a clock-face which consists of exterior and interior dissected pieces, each of said exterior pieces including an individual portion of the clock-face dial, and one of said interior pieces being perforated, perforated hands, and a pin receivable in the perforations in said hands and perforated piece, the perforation in said perforated piece being located in the center of said clock-face.

MYRON A. GILMAN.

Witnesses:
 F. A. CUTTER,
 A. C. FAIRBANKS.